United States Patent

Shaw

[15] 3,656,710
[45] Apr. 18, 1972

[54] BOTTOM OPENING VALVE

[72] Inventor: Harry N. Shaw, Chicago, Ill.

[73] Assignee: The Golconda Corporation, Chicago, Ill.

[22] Filed: July 9, 1970

[21] Appl. No.: 53,549

[52] U.S. Cl. ............................. 251/144, 251/231, 251/284
[51] Int. Cl. ................................... F16k 1/00, F16k 31/52
[58] Field of Search ........................... 251/144, 231, 284

[56] References Cited

UNITED STATES PATENTS

| | | | |
|---|---|---|---|
| 1,954,597 | 4/1934 | Mullen | 251/144 X |
| 1,890,247 | 12/1932 | Dieterich | 251/144 X |
| 3,199,534 | 8/1965 | Shaw et al. | 251/144 X |
| 3,420,495 | 1/1969 | Muehl | 251/144 |

*Primary Examiner*—William R. Cline
*Attorney*—Harbaugh and Thomas

[57] ABSTRACT

A positive opening and self-closing valve for low pressure fluids having a housing with a valve port around a top opening and spaced from an inner peripheral shoulder. A two-part valve member is used having an upper housing and seat connected to a lower face ring with depending circumferentially spaced radial stop and guide members. The valve member is assembled with the housing above and stop members below the peripheral shoulder with a resilient annular valve seat member retained peripherally between the upper seat and the face ring. The valve is crank-operated for reciprocation from the closed position upwardly to the open position within the limits of the spacing provided by the peripheral shoulder and the radial stop and guide members. The crank shaft for the valve extends through the housing between or adjacent to the stop and guide members and is offset from the vertical axis of the valve member. A connecting rod extends from a wrist pin in the upper housing of the valve member to the crank shaft where it is coupled by means of an arcuate yoke and crank pin to a radial crank member carried by the crank shaft. In the closed position of the valve the arcuate yoke allows the radial crank member to rotate past bottom-dead-center to a locked position and at the same time compressing the resilient valve seat member between the valve seat of the upper housing and the lower face ring and upon the valve port. In the open position of the valve the connecting rod is moved to a vertical position and is stopped by the radial stop members with the radial crank member in an intermediate position (less than top-dead-center) so that the valve is self closing.

11 Claims, 6 Drawing Figures

PATENTED APR 18 1972 3,656,710

HARRY N. SHAW
Harbaugh & Thomas
ATT'YS

INVENTOR.
HARRY N. SHAW
BY
Harbaugh & Thomas
ATT'Y.S

INVENTOR.
HARRY N. SHAW
BY Harbaugh & Thomas
ATT'Y.S

BOTTOM OPENING VALVE

BACKGROUND OF THE INVENTION

Bottom opening valves for tanks are known in the art. In these valves the valve member is generally reciprocated upwardly to its open position spaced from the valve port by means of a crank or traveling screw and is brought to the closed position by reversal of the action. The connections between the valve member and the operating crank or screw are critical to the proper and smooth operation of the valve. For many applications it is desirable that the valve be self-closing but this introduces problems of the force required to maintain the open position of the valve. In the types of valves wherein both opening and closing are accomplished by the linkage, means must be provided to maintain the valve in a centered position during both opening and closing. Coaxial alignment of the thrust forces opening the valve at the moment of greatest torque is either not provided for or not maintained in the prior art valves. To accomplish this in part various forms of guide housings, wing valves and balance springs are used which complicate the valve construction and require return springs and associated housings therefore, as shown in Jacobs U.S. Pat. No. 1,369,111 or Marx U.S. Pat. No. 3,145,968, where there is no direct connection between the reciprocating valve rod and the valve itself. Corrosion, wear, changes in the physical conditions in the environment of the valve and accumulations of dirt, sludge and the like on the working parts also adversely influence the proper operation and life of the valves. These and other disadvantages of the prior art valves are overcome or mitigated by the instant invention.

SUMMARY OF THE INVENTION

The invention concerns a bottom opening valve which has positive opening and closing action; locks upon a resilient valve seat member within a confining annulus to maintain a positive leak-proof seal; is provided with guide means that maintain accurate seal-disc alignment and is provided with a connecting rod, arcuate yoke and crank arm linkage which locks past bottom-dead-center with the resilient valve seat under compression. The valve has a start-to-open position at the maximum torque relationship of the linkage and an open position intermediate the bottom-dead-center and top-dead-center positions of the crank arm linkage with the thrust force of the connecting rod maintained substantially normal to the fluid pressure forces acting on the valve member, resulting in positive self-closing characteristics.

Furthermore the valve of this invention is characterized by having the crank shaft offset from the center line of the valve member and contiguous to a depending guide member on the lower valve part to lock the valve member against rotation; and by providing not only a high ratio of lifting force on the valve member to applied force on the operating handle at the start-to-open position of the linkage but also a lesser ratio of these forces to maintain the valve in open position. The crank arm linkage of this invention provides sufficient seat disc lift of the valve member so that the circumferential flow area of the valve in the open position exceeds the seat port area. The outer surfaces of the depending radial stop members have undercuts that register in a position opposite the valve seat at the port, in the open position, to prevent vibration of the guide surface or movement of the valve member from deforming the seating surface of the valve port.

The valve of this invention is also provided with a steam jacket to insure against freeze-ups. Body breakoff grooves are provided in the housing and an over-torque notch is provided in the operating handle, each located so as to insure that in the event of an accident the seal will not be broken or product lost. The linkage is adjustable so that predetermined closing pressure and forces can be applied to the seal to accommodate all tank pressure conditions.

DESCRIPTION OF THE DRAWINGS

Illustrative embodiments of the invention are shown in the drawings wherein.

THE PREFERRED EMBODIMENT

Figure 1:
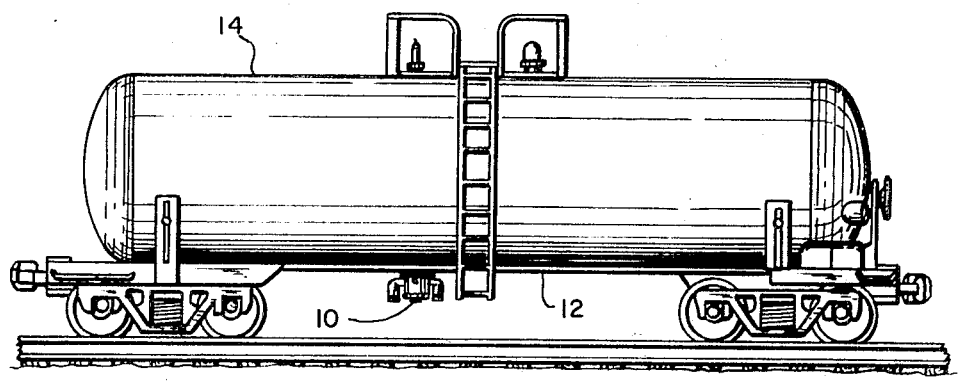
FIG. 1 is a side elevational view of a tank car showing the location of the bottom opening valve of this invention.

Referring to the drawings, particularly FIG. 1, shows the valve 10 of this invention attached to the bottom wall 12 of the tank car 14 which is used to transport various fluids. The tank car 14 can represent a storage tank or a chemical processing vessel with which the valve of this invention is used. The fluids are in the liquid phase and of the group consisting of ammonia solutions, gasoline, fuel, oil, benzene; alcohols, carbon disulfide, carbon tetrachloride, and ethylene glycol, as examples.

Figure 3:
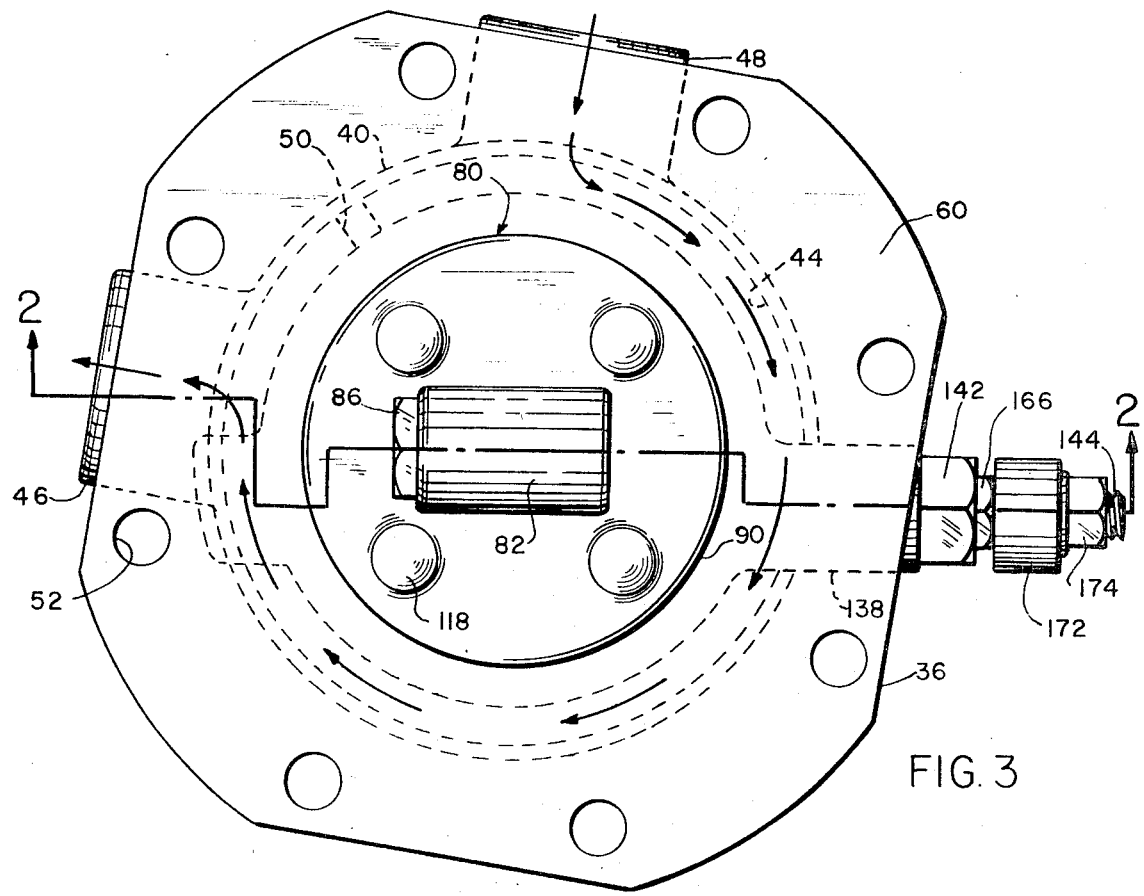
FIG. 3 is a fragmentary top plan view of the valve detached from the tank.
Figure 2:
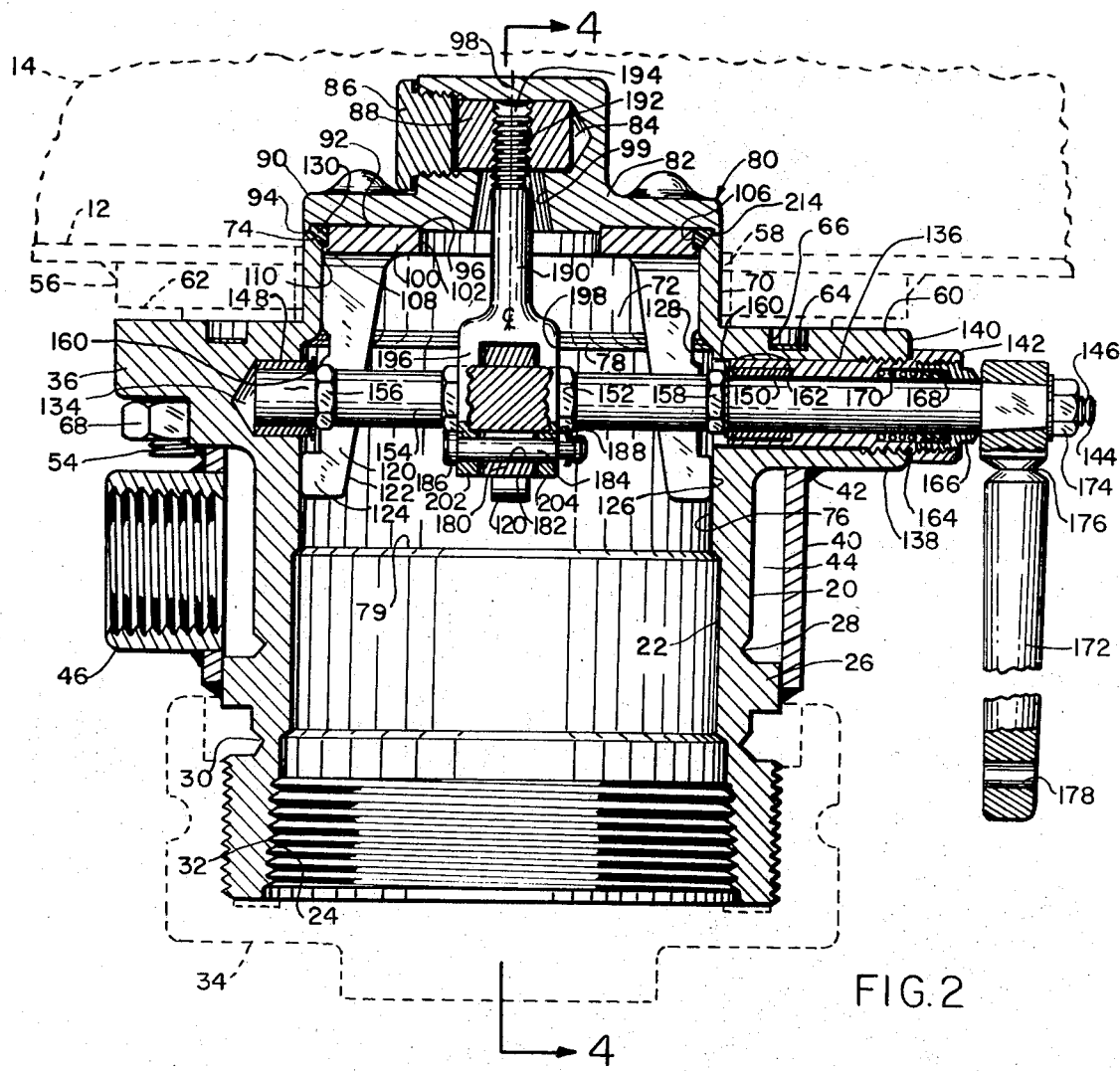
FIG. 2 is a partial cross-sectional view through the housing of the valve along the axis of the operating crank shaft and showing the tank bottom in broken lines.
Figure 4:
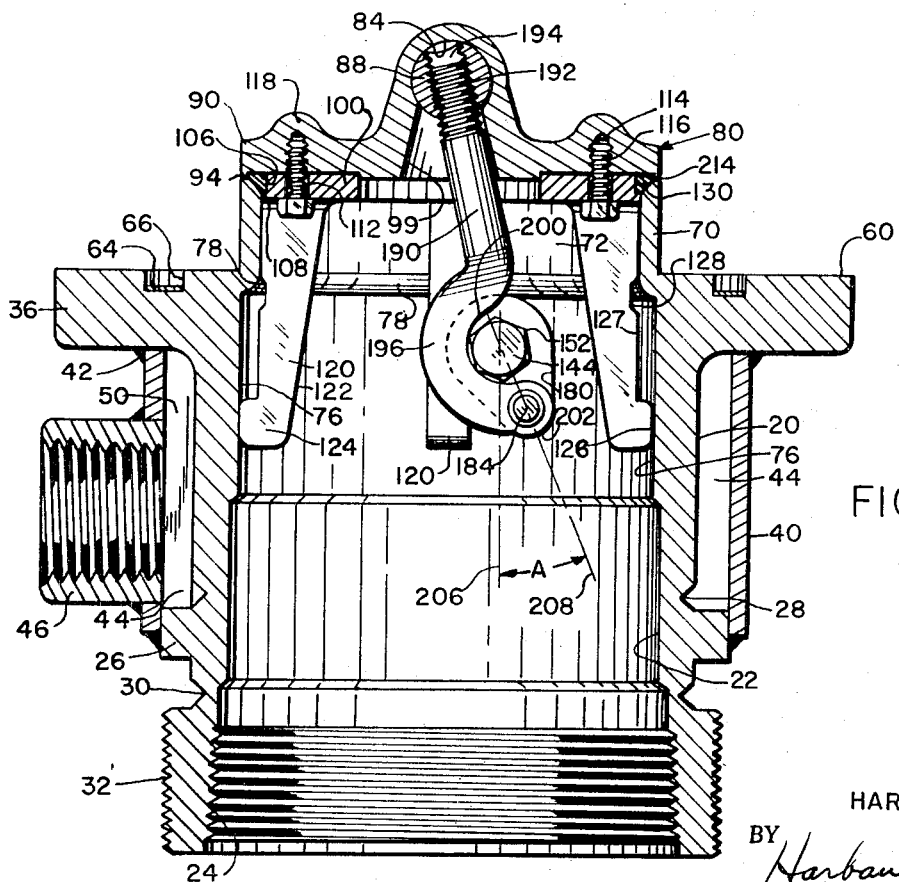
FIG. 4 is a partial cross-sectional view taken along the lines 4—4 of FIG. 2 with the valve in the closed position.

Referring to FIGS. 2, 3 and 4, the valve 10 is shown to have the housing member 20 provided with the passage 22 and the internally threaded outlet 24 at the bottom end. The housing has the lower circumferential flange 26 with circumferential break-off notches 28 and 30 on each side thereof. The outlet 24 has the internal threads 32 for attachment to a delivery conduit and external threads 32' to receive the protector cap 34 (shown in broken lines in FIG. 2) for use during transit of the tank car or periods of non-use of the valve.

In the mid-portion of the housing there is provided a circumferential flange 36. The collar 40 is suitably attached at its top and bottom edges as by the weldments 42, between the flange 26 and the flange 36 to provide the steam jacket or passage 44 extending around the body of the valve. The internally threaded nipple 46 is welded into a suitable port in the side of the collar 40 and communicates with the interior of the passage 44. Referring to FIG. 3 it is seen that a second nipple 48 is similarly attached to the collar 40 and in communication with the passage 44, the latter providing an inlet for steam or other heating medium and the nipple 46 providing an outlet. The two nipples are set at substantially right angle positions to each other and a baffle or trap 50 is located between the inlet and outlet nipples so that the passage of heating medium is blocked and must take the longer path around the balance of the passageway 44 as indicated by the arrows. The inlet and outlet nipples can be otherwise arranged, that is positioned diametrically opposite each other so that the flow of heating medium is around both sides of the housing 20.

The flange 36 can take any desired external configuration at its outer edge and is provided with a number of circumferentially spaced bolt holes 52 adapted to receive the bolts 54 or similar fastening means extending from the reinforcing flange 56 (shown in broken lines) that is welded to the tank bottom 12 and encompasses the bottom outlet opening 58 in the tank bottom 12. Both the flange 36 and the flange 56 present flat surfaces, as illustrated at 60 and 62, toward each other and the former has the annular recess 64 to receive a suitable gasket 66 therearound and the latter has an annular flange to seat therein to provide a tight, liquid-proof seal between the flanges. The assembly is held together by the nuts 68 pulled up tightly on the bolts 54.

The top portion of the housing 20 has the upstanding circular valve seat body 70 with the smooth, inner wall 72 thereof defining the valve inlet port terminating in the beveled circumferential valve seat 74 at the top inner edge. The valve port 72 defined by the body 70 is smaller than the passageway 22 and the juncture of the intermediate cylindrical wall or passageway 76 and the valve port 72 forms the shoulder 78. The intermediate wall 76 in turn is slightly smaller than the passage 22 and a second shoulder 79 is defined by the juncture. The passages 22, 72 and 76 are thus coaxial.

The valve member 80 includes the upper housing 82 having the transverse blind bore 84 threaded at its open end to receive the retainer plug 86. The bore 84 forms a smooth bearing member to receive the wrist pin 88, the function of which is to be described. The upper housing 82 has the flat base flange 90 with the smooth under surface 92 and the outer peripheral depending retainer flange 94. The surface 92 is slightly recessed and has the inner circumferential edge 96 located equidistance from the center line 98 of the valve member 80. The frusto-conical bore 99 extends from the underside of the housing into communication with the blind bore 84 for a purpose to be described.

The lower part of the valve body 80 comprises the face ring 100 having the central opening 102 extending circumferentially around the conical opening 99 and engaging in a guided centering relationship over the edge 96 of the flange 90. The face ring 100 is provided with a smooth upper surface 104 which fits against the surface 92 of the flange 90. The outer curved edge 106 of the face ring is spaced inwardly from the depending edge flange 94 and has the lower radial flange 108, with the curved under surface 110, which registers with the bottom inside corner of the beveled valve seat 74 in the closed position of the valve.

As shown in FIG. 4 the face ring 100 has suitable spaced bore holes 112 while the flange 90 has the matching threaded bores 114 to receive the machine bolts 116 to hold the upper and lower parts of the valve body 80 together. The lobes 118 (FIG. 3) are cast into the upper housing to receive the bores and reduce the amount of metal and consequently the weight of the valve body. In this instance four bolts 116 hold the assembly together.

The bolts 116 are spaced between the depending guide members or legs 120 for easy access, there being four such guide members in the illustrated valve. The guide members 120 are formed as an integral part of the face ring 100 but may be separately attached parts. Each of the guide members has an outwardly tapering inside edge 122 and a radially extending lug member 124 at the bottom end. The lug members are in the same plane at the periphery of the valve member and have their outer bearing surfaces or edges 126 in sliding, guiding contact with the cylindrical wall 76. The lug members 124 are adapted to engage under the shoulder 78 to limit the upward movement of the valve. The guide members 120 have rounded edges 127 which conform to the internal shape of the valve port 72 and are each undercut at 128. These undercuts are located at a plane intermediate between the face ring 100 and the lugs 124. The annulus defined by the outer depending edge 94 of the flange 90 and the lower flange 108 of the face ring defines, in the assembled valve member 80, a recess of triangular cross-section, to receive the resilient valve seat or gasket 130, which is made of tough chemical resistant plastic material such as one of the fluorocarbon plastics known under the proprietary name of Teflon. These include but are not limited to polytetrafluoroethylene, fluorinated ethylenepropylene, chlorotrifluoroethylenes and polyvinylidene fluoride. The resilient plastic used is characterized by their toughness, retention of form at high temperatures, resistance to abrasion, chemical inertness and excellent performance under extreme conditions. The selection of the plastic for the seal 130 to be used with any particular fluid to be stored in the tank 14 or controlled by the valve in a process stream, is a matter within the skill of the art.

From this description, it is apparent that the valve member 80 is assembled by placing the plastic valve seat 130 on the face ring 100, placing this sub-assembly into the opening 22 and up through the opening 72 followed by setting the top housing 82 thereon and affixing the bolts 116 into the matching bores 112 and 114. The resilient seal 130 can be molded so that it is slightly deeper than the distance between the flange 108 and the surface 92, when the bolts 116 are drawn up tightly so that it is compressed to some degree against and within these surfaces. Thus, the sealing surface 132 of the resilient ring 130 can be flat and conical as shown. The ring 130 must be completely confined to prevent cold flow and not lose compression force against the seat.

The housing 20 is provided with the blind bore 134 (FIG. 2) which communicates with the interior of the housing. Axially aligned therewith on the opposite side of the housing there is provided the bore 136 which extends through the side boss or housing 140 and is internally threaded at its open end to receive the sleeve 142 having an outer hex head. The crank shaft 144, having the threaded end portion 146, is carried in the bores 134 and 136 by means of the bearings 148 and 150.

The shaft 144 has the splined portion 152 located in the plane of the center line 98 of the valve member 80, preferably comprising an enlarged hexagon-shaped section of the shaft. The splined portion 152 can extend over that part of the shaft between the bearings or be machined off, as at 154 to a cylindrical configuration in order to reduce the turbulence in the fluids passing through the valve. Opposite each bearing there is provided a retaining shoulder, as indicated at 156 and 158 on the shaft which may be a portion of the hexagon splining. Between these shoulders and the bearings, the pair of thrust washers 160 are placed. The washers 160 are preferably made of a suitable tough plastic such as the polyamides commonly known as nylon.

The bearing 150 is carried in the annular recess 162 between the removable sleeve 142 and the shaft and another seal 164 engages between the sleeve and the end of the housing 140. The sleeve 142 is internally threaded at the other end to receive the packing nut 166 which engages upon suitable sealing gaskets 168 and the compression spring 170 to form a tightly sealed yet rotatable relationship for the shaft 144.

The end portion 146 of the shaft is splined to the operating lever 172 and held thereto by the lock nut 174. The lever 172, as viewed in FIG. 2 is vertical and in its closed position. The lever 172 has the over-torqueing breakoff notch 176 and the end of the handle is provided with a cross bore 178 so that it can be affixed to a stationary part of the assembly or tank for the purposes of holding the valve in the open or closed positions.

Figure 5:
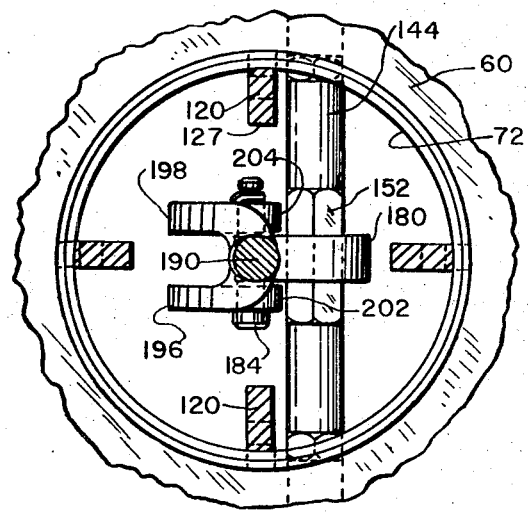
FIG. 5 is a cross-sectional view along the lines 5—5 of FIG. 4.

As better shown in FIGS. 4 and 5, the shaft 144 extends off-center through the housing 20 and is in a position adjacent to an opposite pair of guide members 120, in which position the shaft prevents the rotation of the valve 80 about the axis 98. The hexagon spline portion 152 carries the crank arm 180 about the axis 98. The hexagon spline portion 152 carries the crank arm 180 and the extended end of the crank arm has to bore 182 (FIG. 2) carrying the crank or cross pin 184. The pin 184 has the head 186 at one end and is held in place by any suitable means such as the cotter key 188 at the other end. The crank arm 180 rotates with the shaft 144 and carries the cross pin 184 therewith.

The valve head assembly 80 is connected to the crank arm 180 by means of the connecting rod 190. The threaded end 192 of the rod 190 extends through the conical opening 99 and engages the threaded bore 194 of the wrist pin 88. The lower end of the connecting rod is bifurcated and formed with a pair of arcuated legs 196 and 198 (FIG. 5). The legs describe an arc of about 180° from the center line of the rod 190 and the inner curved portion 200 (FIG. 4) of each leg has a radius slightly larger than the radius of the splined portion 152. The ends of the legs have cross-bored journals 202 and 204 that engage the cross pin 184 in a rotatable relationship.

In FIGS. 2 and 4, the valve is shown in the closed position with the valve port 72 closed and the sealing gasket 130 held under compression by the down-turned position of the crank 180. The broken line 206 represents the bottom-dead-center (BDC) position of the crank 180 as the valve is being closed. The arcuate legs 196 and 198 allow the crank 180 to turn to the over-center position illustrated by the broken line 208.

The angle A therebetween represents the locking travel of about 25°. As the valve is closed by fluid pressure in the tank 14, or the operation or release of the operating handle 172, the valve face or gasket 130 makes contact with the port 74 a few degrees, about 5° to 10° before BDC (dotted line 206) and the over-travel through the arc represented by the Angle A as allowed by the arcuate legs 196 and 198, over-compresses the gasket slightly to assure a good self containing seating relationship and then releases the compression slightly with the valve locked in closed position by the over-compression effect resisting its release while still retaining a tight seal at the conical gasket and port interface shown. The elasticity of the metal parts and the resilience of the gasket assure a fluid tight seal in the closed position.

Figure 6:
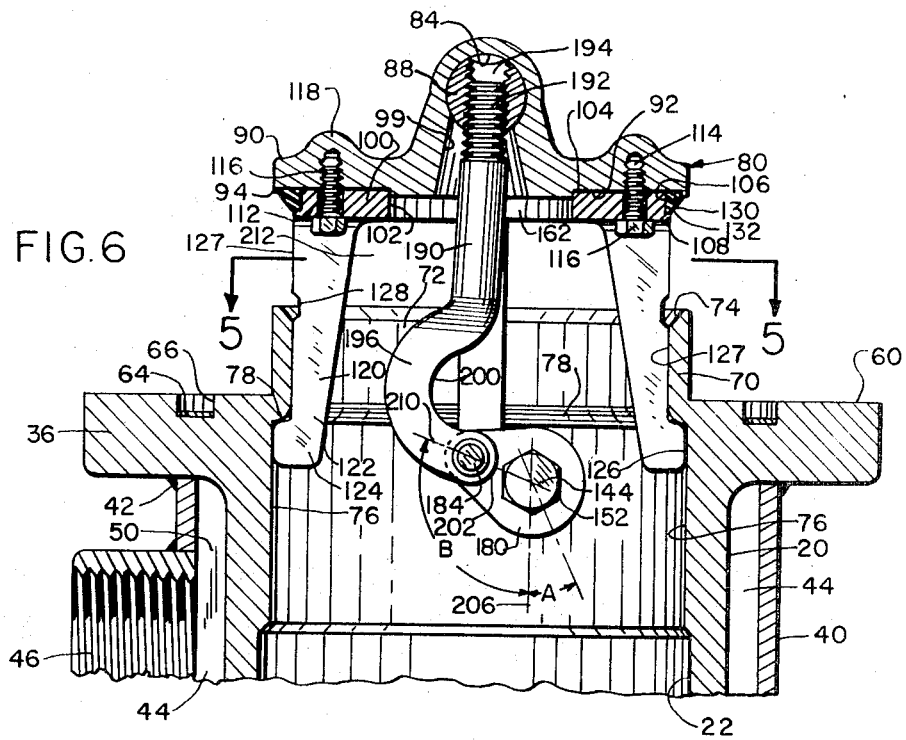
FIG. 6 is a view like FIG. 4 with the valve in open position.

Referring to FIG. 6, the valve 80 has been moved to its wide open position by rotation of the shaft 144 through the locking travel distance of the angle A and then through the opening travel arc represented by the angle B between the dotted line 206 and the dotted line 210, the latter representing the arcuate position of the pin 184 and the yoke 196-198. This position of the valve is limited by the engagement of the lugs 124 against the shoulder 78, as illustrated. This adjustment controls the compression of the seat disc ring 130 throughout arc (A) due to machining tolerances of the linkage. For most purposes the opening travel distance B will be about 100° to 120° and is illustrated by an arc (B) of about 110°. This position is spaced from top-dead-center (TDC). The open position of the valve also brings the surfaces 127 into contact with the side wall of the port 72 so that the valve is held against canting and registers the offsets or undercuts 128 with the valve seat 74. The offsets 128 can be proportionally longer or shorter than those illustrated so that they always register with the seat 74 within the limits of adjustability of the opening arc of the crank. The conical shape of the hole 99 allows sufficient clearance for the reciprocating action of the connecting rod 190 as the wrist pin 88 pivots from side to side.

It is apparent that the valve of this invention is readily adjusted by removing the pin 184, with the valve in open position, and turning the connecting rod by 180° increments in the desired direction. Various thread sizes and pitches can be used so that each revolution of the connecting rod produces the desired finite change in its effective length. In the closed position of the valve (FIG. 4) the seat disc assembly or valve body 80 is spaced from the edge of the valve seat body 70 as indicated by the space 214.

The valve of this invention has positive opening and closing action and the confining action provided by the flanges 94 and 108 for the seat disc ring 130 eliminates cold flow and maintains the compressive forces necessary to hold a fluid tight seal. The four guide members 120 cooperate in perfecting the seal-disc alignment as the valve is operated. The closing of the valve over BDC of the cam and lever yoke locks the valve in closed condition and the elasticity of the metal operating components at BDC position prevents the loss of the required seat ring compressive forces at the over center locked position. Furthermore, the start-to-open position of the cam and lever yoke develops maximum seat disc lifting force with minimum operating lever arm torques. A 50:1 ratio develops between the lifting force on the seat disc assembly 80 and the pull on the handle 172 to initially crack the seat disc open. A 10:1 ratio develops between the force on the open disc and the force on the handle to keep the valve open. The parts are so arranged that the maximum seat disc mechanical lifting forces are substantially perpendicular to the pressure forces and thus eliminate the frictional forces that may be incurred by the guide legs 120.

The guide legs also serve as a lifting stop and the undercuts 128 prevent vibration of the guide surface from deforming the seating surface. The bushing bearings 148 and 150 and other rotating parts are made of heat treated hardened stainless steel for long service and maintenance of alignment at all load bearing locations. The body break-off grooves 28 keep the seat disc contact in the event of undue shearing forces and the handle break-off groove prevents the application of excessive torsional shear on the stem 190 or the shaft 144. In the event the commodity being handled solidifies, steam is introduced in jacket 44 to liquify it.

The operating torque of the valve is low, requiring 22 feet. lbs. under 30 psig tank pressure. The outlet 24 can be connected to various sizes of unloading lines. An emergency cable and a latch can be provided for the handle 172. The latch can be used to hold the valve open and the cable can be used to release the latch in an emergency, allowing the valve to close instantly. A fusible link can be installed in the latch which would allow automatic closure of the valve in the event of fire.

From this description it is apparent that various modifications can be made in the valve of this invention. The resilient ring 130 can be retained by flange means on the frusto-conical valve surface 74 instead of by the disc assembly 80. The resilient sealing ring 130 can be sized to suit the particular valve assembly and to accommodate or provide different flow and closing relationships as desired. Preferably, a self-centering frusto-conical relationship is provided between the ring 130 and the valve seat 74. The cylindrical guide surface 72 can be below the shoulder 78 instead of above it as illustrated. A hand wheel can be used to operate the valve in place of the lever 172, provided there is sufficient clearance between tank flange and stem for such hand wheel. The shaft 144 need not be off-set as shown in FIG. 3. The outlet 24 can be located on the side of the housing instead of at the bottom. Any suitable means can be used to affix the valve housing 20 to the wall of the vessel containing the fluid to be handled. The heating jacket provided by the collar 40 can be omitted.

The undercut portions 128 in the guide edges 127 can be of any desired depth into these edges and be of various lengths along the edges 127. In any event the preferred point of registry of the undercuts 128 with the valve port 74 is illustrated in FIG. 6 in the open position of the valve. It is also to be observed that the edges 127 have the same circumferential configuration as the outer edge of the flange 108.

The attaching bolts 116 are spaced between the guide members 120. A sufficient number of guide members 120 is used to maintain exact alignment of the disc valve assembly 80 with the valve port 74. The functional parts of the guide members need not all be identical, that is, where four guide members are used, for example, only one of the opposing pairs need have the stop lug member 124 thereon. The guide members are long enough in relation to the height of the housing 70 and the location of the shaft 144 so that in the open position of the valve in FIG. 6, there is no possibility that the valve disc assembly 80 can turn on the connecting rod 190 and cause the bottom of the lugs 124 to catch on the shaft 144. In other words, the spaced guided relationship of the guide members 120 along the side of the shaft 144 as shown in FIG. 5 is maintained in all positions of the valve.

What is claimed is:

1. A self-closing bottom opening valve comprising:
   a valve housing defining a walled passageway with a valve port at one end and an outlet at the other end;
   a valve assembly having a central housing portion on one side and a peripheral disc means on the other side;
   a resilient circumferential valve member carried at the periphery of said disc means for closure upon said valve port;
   circumferentially spaced depending guide members extending from said other side of said disc means in sliding and centering contact with said walled passageway;
   crank means rotatably mounted through and on an axis transverse the longitudinal axis of said walled passageway;
   said transverse axis being off-set radially from the longitudinal axis of said passageway and said central housing portion;
   rod means pivotally connected at its ends between said crank means and said central housing to reciprocate said valve assembly along the longitudinal axis of said passageway to and from open and closed positions;

stop means limiting the movement of said crank means to a position before its top dead center position with said disc valve means in the open position;

the opposite reciprocation of said connecting rod means carrying said resilient valve means into initial closing contact with said valve seat before its bottom dead center position, and into compression contact at bottom dead center position;

said crank means having a throw past bottom dead center position which is less than the throw between initial closing contact and compression contact whereby said resilient valve member is retained in locked closed compression contact with said valve port.

2. A bottom opening valve in accordance with claim 1 in which:

said peripheral disc means is provided with a downwardly and outwardly opening circumferential groove around its periphery and is provided with retaining flanges at the outermost edges; and said resilient valve member is retained within said groove and between said flanges.

3. A bottom opening valve in accordance with claim 1 in which:

said peripheral disc means is provided with a bottom surface having radially spaced concentric depending flanges thereon and includes a face ring detachably affixed to said surface between said flanges;

said face ring having a central opening encompassing the innermost of said flanges and a radially extending flange around the periphery spaced inwardly from the outermost depending flange on said housing member; and said resilient valve member is retained between said depending radial flanges.

4. A bottom opening valve in accordance with claim 1 in which:

said walled passageway is provided with a circumferential shoulder intermediate the ends thereof;

said stop means comprise radial lug members on said guide members adapted to engage against said shoulder.

5. A bottom opening valve in accordance with claim 4 in which:

said guide members have cut-out portions in their outer edges spaced above said lug members;

said cut-out portions registering with and being opposite to said valve port in the open position of said valve.

6. A bottom opening valve in accordance with claim 4 in which:

said central housing portion carries a rotatable wrist pin having a threaded cross bore therein;

said rod means is provided with a threaded end rotatably engageable within said cross bore; and the off-set transverse axis of said crank means is adjacent to at least a pair of said guide members whereby rotation of said disc assembly upon said connecting rod is prevented.

7. A self-closing bottom opening valve comprising:

a valve housing defining a walled passageway with an upstanding conical valve port at the top and an outlet at the bottom, said housing being adapted for sealed attachment within an opening in the bottom wall of a vessel;

a disc valve assembly co-axial with said passageway and valve port comprising an upper housing member having a lower circumferential radial flange portion and a face ring detachably mounted against the under face of said flange;

a wrist pin rotatably mounted on an axis transverse said upper housing member;

a center bore in said upper housing open at its top to said wrist pin and at its bottom through said face ring;

said radial flange and said face ring defining at their periphery an annular downwardly facing recess;

a circumferential resilient valve member retained within said annular recess and presenting a mating valve surface adapted to be seated upon said valve port;

a series of circumferentially spaced oppositely disposed guide members depending from said face ring inside said walled passageway;

a downwardly facing circumferential shoulder in the wall defining said passageway and spaced from said valve port;

said guide members having upper and lower outer surfaces in sliding relationship with said walled passageway on both sides of said shoulder;

the outer upper surfaces of said guide members including cut-out portions equally spaced downward from said face ring;

a crank shaft mounted on an axis through said walled passageway and diametrically offset from an opposite pair of said guide members;

a crank arm affixed to said crank shaft;

a connecting rod having an upper shank portion adjustably connected to said wrist pin and a lower arcuate portion pivotally mounted to said crank arm;

a handle member attached to said crank shaft on the outside of said housing for rotation thereof and reciprocation of said disc valve assembly sequentially upward to an open position and downward through an initial contact position, a bottom dead center compression contact position and a closed past dead center compression contact position on said valve port;

said lower surfaces of said guide members being engageable with said circumferential shoulder in said passageway to limit the open position of said disc valve assembly simultaneously with the register of said cut-out portions of said upper surfaces with said valve port; and said arcuate portion of said crank arm being engageable on its inside with said crank shaft to limit the past dead center position of said crank arm to a throw below said initial contact position to retain said closed compression contact position.

8. A bottom opening valve in accordance with claim 7 in which:

the upper shank portion of said connecting rod and said wrist pin threadably engage each other whereby to allow adjustment of the length of the connecting rod by rotation of said rod within said threaded engagement to adjust for proper compression contact of said resilient valve member in said closed position and said guide members operatively engage said crank shaft to prevent rotation of said connecting rod in relation to said disc valve assembly during operation of said valve.

9. A self-closing bottom opening valve comprising:

a valve housing defining a walled passageway with a valve port at one end and an outlet at the other end;

a disc valve assembly having a peripheral resilient valve member adapted to close upon said valve port;

said disc valve assembly having circumferentially spaced depending guide members adapted to engage said walled passageway in sliding contact and center said resilient valve member upon said valve seat;

a crank shaft rotatably mounted transverse said walled passageway;

crank means carried by said crank shaft;

a connecting rod carried by said crank means at one end and pivotally mounted to said disc valve assembly at the other end;

said connecting rod having an arcuate shank portion pivotally connected to the extended end of said crank means;

stop means adapted to limit the upward movement of said crank means at a position before top dead center; and said arcuate shank portion being engageable with said crank shaft to limit the past dead center position and retain said resilient valve member in closed compression contact with said valve port.

10. A bottom opening valve in accordance with claim 9 in which:

means are provided to adjust the effective length of said connecting rod whereby said top dead center, and closed compression contact positions of said resilient valve member and said valve port are variable.

11. A self-closing bottom opening valve comprising:

a valve housing defining a walled passageway with a valve port at one end an outlet at the other end;

a disc valve assembly having a peripheral resilient valve member adapted to close upon said valve port;

said disc valve assembly having radially spaced depending guide members having side edges with protuberances at their ends adapted to engage said walled passageway in sliding contact and center said resilient valve member upon said valve seat;

crank means rotatably mounted on an axis transverse of said walled passageway;

a connecting rod carried by said crank means at one end and pivotally mounted to said disc valve assembly at the other end;

a stop member in said passageway including a shoulder portion to engage said protuberances of said guide members to limit the upper movement of said crank means at a position before top dead center whereby said valve is self closing.

* * * * *